June 8, 1948. R. M. HUGHEY 2,443,038
AUTOMATICALLY ADJUSTABLE SPEED POWER TRANSMISSION
Filed March 11, 1947 2 Sheets-Sheet 1
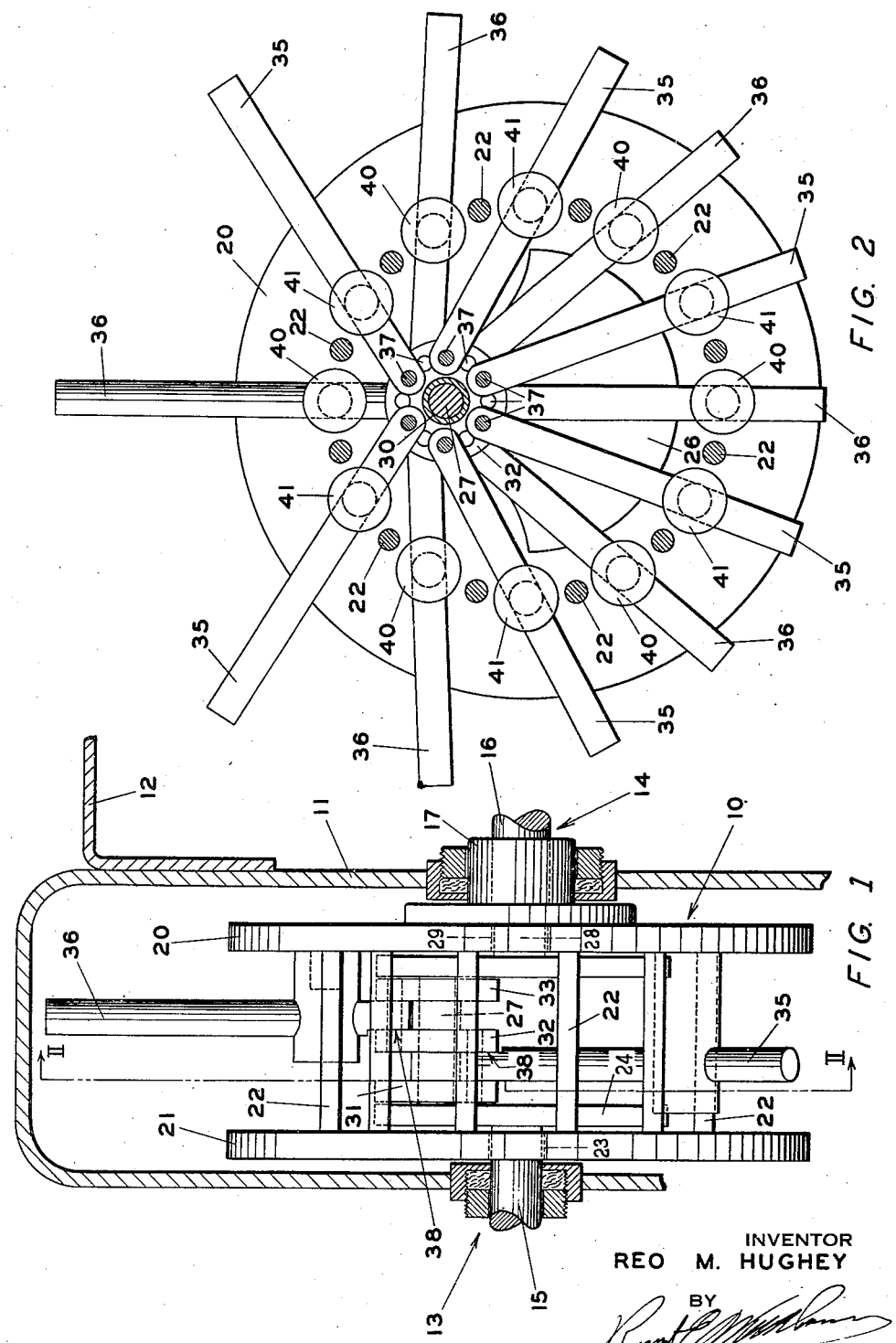
INVENTOR
REO M. HUGHEY
ATTORNEY

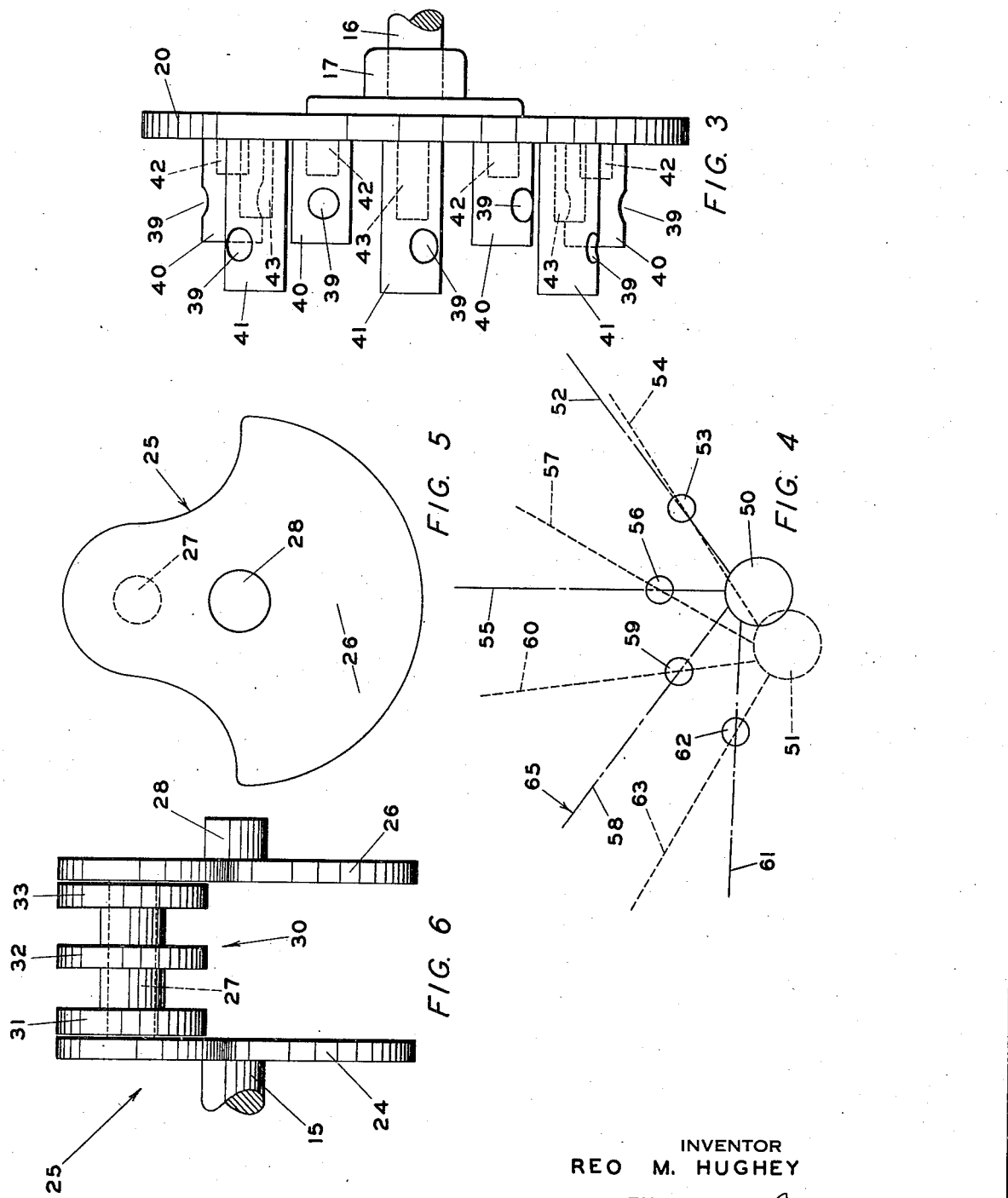

Patented June 8, 1948

2,443,038

UNITED STATES PATENT OFFICE 2,443,038

AUTOMATICALLY ADJUSTABLE SPEED POWER TRANSMISSION

Reo M. Hughey, Mount Morris, Mich.

Application March 11, 1947, Serial No. 733,834

6 Claims. (Cl. 74—64)

This invention relates to a power transmission device wherein the driving-driven speed ratio of said transmission automatically adjusts itself to any variations in the driven speed or load thereon.

Numerous attempts have been made to develop a practicable, variable speed transmission adaptable, for example, to the changes in power and speed demanded of an automobile. Such efforts have been motivated by the noise, inflexibility, necessity for some type of gear control and many other undesirable aspects of the conventional, gear type transmission.

The hydraulic clutch has been used with success in conjunction with a standard type transmission, and has thereby overcome some of the undesirable features of the gear transmission. However, these gains are accomplished at the expense of using two units in the place of one, each such units being at least equally as complicated and costly as the conventional single unit.

It becomes evident, therefore, that a variably adjustable speed power transmission would eliminate the majority of undesirable features in a gear type transmission, would eliminate the need for, and in some instances replace the advantages of, a hydraulic clutch, and would produce a substantial improvement in the transmission means of low cost engines, particularly of the combustion type.

Accordingly, it becomes a primary object of this invention to provide a variably adjustable speed power transmission whereby changes in the load imposed onto the driven means will automatically effect a compensating change in the speed ratio between the driven and the driving means.

A further object of this invention is to provide means as aforesaid whereby changes in the speed and/or load imposed upon the driven means are automatically absorbed and provided for within the said transmission without materially affecting the driving means.

A further object of this invention is to provide means as aforesaid which will substantially replace the need for both a conventional gear type power transmission and a hydraulic clutch.

A further object of this invention is to provide means as aforesaid which will eliminate or materially decrease the undesirable features of a gear type power transmission.

Other objects and purposes of this invention will become apparent to persons familiar with this type of equipment upon referring to the accompanying drawings and reading the following specification.

In order to meet the objects and purposes heretofore mentioned, as well as others incidental thereto and associated therewith, I have provided a transmission means, operating in a suitable fluid, such as oil, within an appropriate casing which may, for example, be attached to the engine block. A preferred embodiment of the said transmission herein disclosed is comprised of a disk, mounted upon a first shaft, supporting a plurality of posts and a crank mounted upon another shaft, coaxial with said first shaft, supporting a plurality of bars which are slidably associated through said posts. Said bars will function reciprocably with respect to said posts when said shafts are rotating at dissimilar speeds. However, due to the inertia of the said bars and the impedance of the oil, rotation of the shaft attached to said crank will tend to induce an equivalent rotation in the shaft attached to said disk. When the shafts are rotating at equal speeds, the bars have no motion relative to the posts.

For one particular embodiment of the variably adjustable speed power transmission attention is directed to the drawings in which:

Figure 1 is a side view of the invention including a fragment of the casing surrounding said transmission.

Figure 2 is an end view of the invention taken in section along the line II—II of Figure 1.

Figure 3 is a side view of the disk supporting the pivot posts.

Figure 4 is a diagrammatic view of a portion of the operating cycle of the invention.

Figure 5 is an end view of the crank, exposing the counterweight web thereof.

Figure 6 is a side view of said crank.

A variably adjustable speed power transmission 10 is completely housed within a suitable casing 11, a sectioned portion of which appears in Figure 1. Said casing may be supported in any convenient manner, but is advantageously secured to the engine block by means of suitable brackets, one of which is indicated at 12. Appropriate stuffing boxes of any conventional type are provided at 13 and 14 in opposite sides of said casing around the openings, through which the shafts 15 and 16 extend, in order to confine within said casing a fluid, such as oil, whose function will be disclosed hereinafter.

The shaft 16, which is preferably, but not necessarily, either coupled with or a part of the driven shaft connected to the driven means, is attached to the driving end disk 20 by means of the hub 17 in any conventional manner such as by means of a key, key way and set screw, not shown. A driven end disk 21 is secured by means of the rods 22 to said disk 20 and is co-axial therewith. Said disk 21 has a properly bushed opening 23, in which the shaft 15, which may be coupled, clutched or otherwise engaged to the drive shaft of the driving means, is partially supported and free to rotate.

Inasmuch as the disk 21 serves primarily as a guide bearing support between the shaft 15 and the disk 20, its shape, thickness and other physical characteristics are relatively unimportant, so long as it is able to withstand the stresses to which it may be exposed.

The extremity of said shaft 15 remote from the end which engages the driving means is secured in any convenient manner, such as by welding, to one counterbalanced web 24 of the crank 25 illustrated in Figures 5 and 6.

The web 24 is connected through a crank pin 27 to another counterbalanced web 26, to which is secured a short shaft 28 in a manner similar to that in which the web 24 may be secured to the shaft 15 and co-axial therewith. The said short shaft 28 is rotatably held within a suitable recess 29 in the center of the said disk 20. Hence, insofar as the disks 20 and 21 are concerned, the crank 25 is free to rotate when motivated by the shaft 15.

A flanged bushing 30 is rotatably supported upon said crank pin 27, as shown in Figure 6. A plurality of inertia bars 35 is pivotally mounted in uniform, co-planar distribution between the flanges 31 and 32 of the said bushing 30, as illustrated in Figures 1 and 2. Another plurality of inertia bars 36 is pivotally mounted in uniform, co-planar distribution between the flanges 32 and 33 of the said bushing 30. The said inertia bars 35 and 36, which are preferably, but not necessarily, of solid cylindrical, metallic construction and equal in length and diameter so long as they are in dynamic balance when the crank rotates, may be pivoted between the said flanges 31, 32 and 33, respectively, in any convenient manner, such as upon the pins 37, shown in Figure 2. That side of the extremity of said inertia bars 35 and 36 which engages the flange 32 of said bushing 30 may be beveled off, as indicated at 38 in Figure 1, to reduce the distance between the flanges 31, 32 and 33, hence the required length of said pins 37 for bars of any given diameter, while at the same time bringing the plane of the inertia bars 35 closer to the inertia bars 36 for reasons and advantages to be disclosed hereinafter.

A plurality of relatively short posts 40, equal to the number of bars 36, and a plurality of relatively long posts 41, equal to the number of bars 35, is rotatably secured to that surface of said disk 20 facing said disk 21, by means of the groups of pins 42 and 43, respectively. Said pins 42 and 43 may be affixed to said disk in any suitable manner, such as by insertion and brazing. They are radially and alternately disposed about said disk 20, equi-distant from the center thereof and at spaced intervals with respect to each other, as may be observed in Figure 2.

Through that end of each post 40 and 41, remote from the extremity rotatably associated with said disk 20, there is an opening 39 sufficiently large to slidably receive that end of one of the said bars 35 and 36, not pivoted on the said bushing 30. It will be understood that the said posts 40 and 41 are at such distance from the center of the disk so that said bars will be free to reciprocate therethrough during a normal cycle of the transmission, hereinafter described, without becoming disengaged from said posts, and that said posts will not impede the passage of the bushing 30 as said crank 25 rotates with respect thereto.

It may now be observed why the plane of the bars 35 and the plane of the bars 36 are advantageously brought close together, while at the same time, brought closer to the disk 20. Such construction, by permitting the maximum available length in the pins 37, the minimum necessary length of the posts 41, and at the same time a minimum distance between the disks 20 and 21, provides for sturdiness and compactness in the unit.

The counterbalances of the crank webs 24 and 26 are designed to counteract the mass of the overhung portion of the crank as well as the bushing and other effective weights.

Operation

The variably adjustable speed, power transmission, to which this invention relates and whose construction is described above, may appropriately and advantageously replace the conventional, gear type transmission wherein such transmission means is desired between a driving means and a driven means. When installed, said shaft 15 will preferably be associated with the driving means and said shaft 16 will be associated with the driven means, both as aforesaid. Said casing 11 is then filled with some reasonably viscous fluid, hereinafter referred to as oil for illustrative purposes only, through an appropriate, sealable opening therein, not shown.

If, as shown diagrammatically in Figure 4, the shaft 15 is caused to rotate by the driving means in a counterclockwise direction, the crank pin 27 and bushing 32 mounted thereon will move from position 50 to position 51. By so doing, the bar 52 will be reciprocably displaced with respect to and by virtue of its relationship with the post 53, to the position 54. In the same manner, the bars 55, 58, and 61 will be displaced, with respect to and by virtue of their respective relationships with the posts 56, 59 and 62, to the positions 57, 60 and 63 respectively.

From a comparison of the displacement angles swept out by the various bars shown in Figure 4, it appears that bar 58 moves the greatest angular distance in reaching position 60. It can also be established that there is a greater portion of said bar 58 extending beyond said post 59, throughout the above mentioned angular displacement, than the portions of the other bars extending beyond their respective posts.

Reference to Figure 2 reveals that the amount of the bars 35 and 36 which extends beyond those posts 40 and 41 at the bottom of the figure, or opposite from the side to which the crank pin is closest, is relatively small by comparison to the amount which extends beyond said posts at the side of said transmission to which the crank pin is the closest. It also becomes apparent that when less of said bar extends beyond said post than lies between said post and said crank pin 27, any movement of the crank pin end of said bar will produce a proportionately smaller movement of the outer extremity of said bar. On the other hand, when a far greater amount of the said bars 35 and 36 extends beyond the said post 40 and 41 than lies between them and the crank pin 27, any movement of said crank pin will produce a proportionately greater movement of the outer extremity of said bars.

It will be noted that the extremities of those bars extending the greatest distance beyond the posts 40 and 41 will be urged in the opposite direction to the rotational direction of the said crank pin, whereas the extremities of those bars extending the least distance beyond said posts 40 and 41 will be urged in the same direction as the crank pin 27, with respect to the co-axial shafts 15 and 16.

Therefore, if some flexible force is provided to impede the tendency for the outer extremities of the said bars to be displaced, as illustrated in Figure 4, the bars on that side of the transmission to which the crank pin and bushing 30 are the closest will govern the resultant motion of the transmission mechanism within the said casing 11.

With the above mentioned facts in mind, a further consideration of Figure 4 reveals that if, for example, a suitable impedance 65 tends to prevent the outer extremity of the bar 58 in Figure 4 from moving to position 60, then, as the crank pin and bushing 50 move in a counterclockwise direction, the post 59 will be urged to move in a parallel direction also counterclockwise. Since said post 59 is a diagrammatical representation of any post 40 or 41 secured, as aforesaid, to said disk 20, the said motion of said post 59 will produce a counterclockwise motion of the disk 20. In the same manner similar impedances applied to the outer extremities of the bars 61, 55 and 52 will effect concentric movement of said posts 62, 56 and 53 in a direction substantially parallel with the movement of said crank pin and bushing 30, thereby effecting the rotation of the disk 20. This impedance is provided both by oil within the casing 11 and by the inertia to angular acceleration of the several bars as they successively occupy the several sequential positions of the bars shown schematically in Figure 4.

Rotation of the disk 20 will be translated to the driven means through the hub 17 and the shaft 16. At slow rotational speeds of the shaft 15, hence the crank 25, the impeding effects of the oil, as well as the inertia of the outer parts of the bars, onto the displacement of the extended bars will be small. However, as the speed of the driving means is increased, the displacement movements of the said extended bars will increase, as will the impedance to such movement. Any shocks sustained by sudden acceleration or deceleration of either the driving or driven means will be automatically cushioned by the oil within the said casing 11 and surrounding the transmission mechanism 10 and proper ratio adjustment will immediately be made if required. In view of the foregoing, it is obvious that when the driving means is retarded faster than the deceleration of the driven means, the driving means may effect a braking action upon said driven means through the reverse action of the transmission 10.

The variably adjustable speed power transmission illustrated herewith is more particularly suited to medium and/or light power demands. A more effective impedance 65, as indicated in Figure 4, may be effected by flattening the outer extremities of said bars 35 and 36 and thereby modifying the construction for adaptation to heavier power demands. Said flattening will advantageously be perpendicular to the rotational plane of the bars 35 and 36, and will not interfere with the reciprocal motion of the said bars.

It will be understood that this invention does not provide for reversing a uni-directional driving means. This transmission may be operated effectively by associating the driving means with either shaft 15 or shaft 16, but is not designed to rotate in a direction opposite to the means supplying the motivation at any given time.

The oil surrounding said transmission 10 will tend to circulate with the transmission within the casing 11. Hence, centrifugal force will not only increase the impedance of the oil to the displacement motion of said extended bars, but will also reduce the tendency for escape of the oil past the stuffing boxes 13 and 14.

Although the above mentioned drawings and description apply to a preferred embodiment of the subject invention, it is not my intention, implied or otherwise, to limit my invention thereby or to eliminate other variations or modifications, thereof, which do not depart from the scope of my invention unless specifically stated to the contrary in the hereinafter appended claims.

I claim:

1. In a power transmitting mechanism for axially aligned shafts wherein the speed of the driven shaft will be automatically adjusted with respect to the speed of the driving shaft according to the load imposed onto the driven shaft and the power supplied to the driving shaft, the combination comprising: a driving end disk and a driven end disk in parallel relation to each other and concentrically disposed with respect to said shafts held non-rotatably with respect to the driving shaft and held rotatably with respect to the driven shaft; a plurality of rods connecting said disks to hold them non-rotatably with respect to each other; a plurality of pivot posts extending from the driving end disk toward the driven end disk and each having an opening therethrough; a crank rotatable with said driven shaft and having its shaft coaxial therewith; a plurality of inertia bars mounted on a collar which collar is rotatably supported upon the crank pin of said crank, and said inertia bars extending respectively, each reciprocably through the opening in one of said pivot posts; a casing surrounding said foregoing named parts and in rotatable sealing relation to said shafts, and a lubricating and resistance fluid within said casing whereby resistance of said inertia bars to angular rotation, which resistance comes from the viscosity of said fluid and from the inertia to angular acceleration of said inertia bars, creates a reaction when said driving shaft is rotated which acts upon said crank to rotate the driven shaft.

2. In a power transmitting mechanism for axially aligned shafts wherein the speed of the driven shaft will be automatically adjusted with respect to the speed of the driving shaft according to the load imposed onto the driven shaft and the power supplied to the driving shaft, the combination comprising: a driving end disk and a driven end disk in parallel relation to each other and concentrically disposed with respect to said shafts held non-rotatably with respect to the driving shaft and held rotatably with respect to the driven shaft; a plurality of rods connecting said disks to hold them non-rotatable with respect to each other; a plurality of pivot posts extending from the driving end disks toward the driven end disk and each having an opening therethrough; a crank rotatable with said driven shaft and having its shaft co-axial therewith; a plurality of inertia bars mounted on a collar which collar is rotatably supported upon the crank pin of said crank, and said inertia bars extending respectively, each reciprocably through the opening in one of said pivot posts; whereby resistance of said inertia bars to angular rotation, which resistance comes from the inertia to angular acceleration of said inertia bars, creates a reaction when said driving shaft is rotated which acts upon said crank to rotate the driven shaft.

3. In a power transmitting mechanism for axially aligned shafts wherein the speed of the driven shaft will be automatically adjusted with respect to the speed of the driving shaft according to the load imposed onto the driven shaft and the power supplied to the driving shaft, the combination comprising: a driving end disk and a driven end disk in parallel relation to each other and concentrically disposed with respect to said shafts held non-rotatably with respect to the driving shaft and held rotatably with respect to the driven shaft; means connecting said disks to hold them non-rotatably with respect to each other; a plurality of pivot posts extending from the driving end disk toward the driven end disk and each having an opening therethrough; a crank rotatable with said driven shaft and having its shaft co-axial therewith; a plurality of inertia bars mounted on a collar which collar is rotatably supported upon the crank pin of said crank and said inertia bars extending respectively, each reciprocably thru the opening in one of said pivot posts; whereby resistance of said inertia bars to angular rotation, which resistance comes from the inertia to angular acceleration of said inertia bars, creates a reaction when said driving shaft is rotated which acts upon said crank to rotate the driven shaft.

4. In a power transmitting mechanism for axially aligned shafts wherein the speed of the driven shaft will be automatically adjusted with respect to the speed of the driving shaft according to the load imposed onto the driven shaft and the power supplied to the driving shaft, the combination comprising: a driving end disk and a driven end disk in parallel relation to each other and concentrically disposed with respect to said shafts held non-rotatably with respect to the driving shaft and held rotatably with respect to the driven shaft; means connecting said disks to hold them non-rotatably with respect to each other; a plurality of pivot posts mounted on one of said disks and each having an opening therethrough; a crank rotatable with said driven shaft and having its shaft co-axial therewith; a plurality of inertia bars mounted on a collar which collar is rotatably supported upon the crank pin of said crank and said inertia bars extending respectively, each reciprocably through the opening in one of said pivot posts; whereby resistance of said inertia bars to angular rotation, which resistance comes from the inertia to angular acceleration of said inertia bars, creates a reaction when said driving shaft is rotated which acts upon said crank to rotate the driven shaft.

5. In a power transmitting mechanism for axially aligned shafts wherein the speed of the driven shaft will be automatically adjusted with respect to the speed of the driving shaft according to the load imposed onto the driven shaft and the power supplied to the driving shaft, the combination comprising: a driving disk secured to and rotatable with the driving end of said driven shaft, upon which disk is rotatably supported a plurality of pivot posts extending therefrom in the direction of said driving shaft, each of said pivot posts having an opening therethrough; a crank secured to and rotatable with said driven shaft and having its shaft co-axial therewith; a plurality of inertia bars mounted on a collar which collar is rotatably supported upon the crank pin of said crank, said inertia bars extending, respectively, each reciprocably through the said opening in one of said pivot posts; a casing surrounding said foregoing named parts and in rotatable sealing relation to said shafts, and a lubricating and resistance fluid within said casing whereby resistance of said inertia bars to angular rotation, which resistance comes from the viscosity of said fluid and from the inertia to angular acceleration of said inertia bars, creates a reaction when said driving shaft is rotated which acts upon said crank to rotate the driven shaft.

6. In a power transmitting mechanism for axially aligned shafts wherein the speed of the driven shaft will be automatically adjusted with respect to the speed of the driving shaft according to the load imposed onto the driven shaft and the power supplied to the driving shaft, the combination comprising: a driving disk secured to and rotatable with the driving end of said driven shaft, upon which disk is rotatably supported a plurality of pivot posts extending therefrom in the direction of said driving shaft, each of said pivot posts having an opening therethrough; a crank secured to and rotatable with said driven shaft and having its shaft coaxial therewith; a plurality of inertia bars mounted on a collar which collar is rotatably supported upon the crank pin of said crank, said inertia bars extending, respectively, each reciprocably through the said opening in one of said pivot posts; whereby resistance of said inertia bars to angular rotation, which resistance comes from the inertia to angular acceleration of said inertia bars, creates a reaction when said driving shaft is rotated which acts upon said crank to rotate the driven shaft.

REO M. HUGHEY.

REFERENCES CITED

The following references are of record in the file of this patent:

UNITED STATES PATENTS

| Number | Name | Date |
| --- | --- | --- |
| 1,718,073 | Reece et al. | June 18, 1929 |
| 1,860,383 | Chalmers | May 31, 1932 |
| 1,949,042 | Dodge | Feb. 27, 1934 |

OTHER REFERENCES

Ser. No. 373,705, Branda (A. P. C.), pub. June 15, 1943.